(12) United States Patent
Su et al.

(10) Patent No.: US 9,370,719 B2
(45) Date of Patent: Jun. 21, 2016

(54) METHOD AND APPARATUS FOR EXECUTING PLOT INSTRUCTIONS TO SHOW COMPLEX PLOTS

(71) Applicant: TENCENT TECHNOLOGY (SHENZHEN) COMPANY LIMITED, Shenzhen (CN)

(72) Inventors: Jianfeng Su, Shenzhen (CN); Guohong Li, Shenzhen (CN)

(73) Assignee: TENCENT TECHNOLOGY (SHENZHEN) COMPANY LIMITED (CN)

( * ) Notice: Subject to any disclaimer, the term of this patent is extended or adjusted under 35 U.S.C. 154(b) by 0 days.

(21) Appl. No.: 14/589,846

(22) Filed: Jan. 5, 2015

(65) Prior Publication Data

US 2015/0126289 A1    May 7, 2015

Related U.S. Application Data

(63) Continuation of application No. PCT/CN2013/078769, filed on Jul. 3, 2013.

(30) Foreign Application Priority Data

Jul. 4, 2012 (CN) .......................... 2012 1 0229013

(51) Int. Cl.
*A63F 9/24* (2006.01)
*A63F 13/47* (2014.01)
*A63F 13/60* (2014.01)
*A63F 13/65* (2014.01)

(52) U.S. Cl.
CPC ................ *A63F 13/47* (2014.09); *A63F 13/60* (2014.09); *A63F 13/65* (2014.09)

(58) Field of Classification Search
CPC .............. A63F 13/10; A63F 2300/632; A63F 2300/807; A63F 13/47; A63F 13/65
See application file for complete search history.

(56) References Cited

U.S. PATENT DOCUMENTS 5,604,855 A * 2/1997 Crawford ...................... 345/473
6,388,667 B1   5/2002 Sato et al.
(Continued)

FOREIGN PATENT DOCUMENTS

CN    1224368 A    7/1999
CN    1527195 A    9/2004
(Continued)

OTHER PUBLICATIONS

"Maniac Mansion—Wikipedia Article", Jul. 2, 2012 XP055188024.
(Continued)

*Primary Examiner* — Steve Rowland
(74) *Attorney, Agent, or Firm* — Cantor Colburn LLP

(57) ABSTRACT

In a computer-implemented method for executing plot instructions for electronic games to show complex plots, creating a plot object and a plot script in a current scenario based on plot data, by a processor, wherein the plot script comprises a plot instruction with a blockage parameter; reading the plot script to obtain the plot instruction by a processor; analyzing the plot instruction to obtain the plot parameter by a processor; determining a blockage type of the plot instruction, by a processor, according to the blockage parameter of the plot instruction; and the plot object executing the plot instruction, by a processor, according to the blockage type.

20 Claims, 4 Drawing Sheets

(56) References Cited

U.S. PATENT DOCUMENTS

2007/0078706 A1  4/2007  Datta et al.
2012/0190456 A1* 7/2012  Rogers .............................. 463/42
2013/0173531 A1* 7/2013  Rinearson et al. ............ 707/608
2013/0262092 A1* 10/2013 Wasick .............................. 704/9

FOREIGN PATENT DOCUMENTS

| CN | 1584835 A | 2/2005 |
| CN | 101634940 A | 1/2010 |
| CN | 102073498 A | 5/2011 |
| WO | 9841952 A1 | 9/1998 |

OTHER PUBLICATIONS

"SCUMM—Wikipedia Article", Jun. 26, 2012, XP055188026.
"Z-machine—Wikipedia Article", Apr. 21, 2012, XP055188029.
China Office Action issued Jul. 24, 2014 re: Application No. 201210229013.7.
European Search Report issued May 15, 2015 re: Application No. PCT/CN2013/078769.
International Preliminary Report on Patentability issued Jan. 15, 2015 re: Application No. PCT/CN2013/078769.
Taiwan Office Action issued Dec. 15, 2014 re: Application No. 10321733750.
International Search Report and Written Opinion issued Oct. 17, 2013 re: Application No. PCT/CN2013/078769; citing: CN 1527195 A, CN 1584835 A, CN 1224368 A and US 2007/0078706 A1.
Japanese Office Action issued Jun. 9, 2015 re: JP Application No. 2015-518822; pp. 1-7; citing: WO 98-41952 A1 (corresponding U.S. Pat. No. 6388667 B1).

* cited by examiner

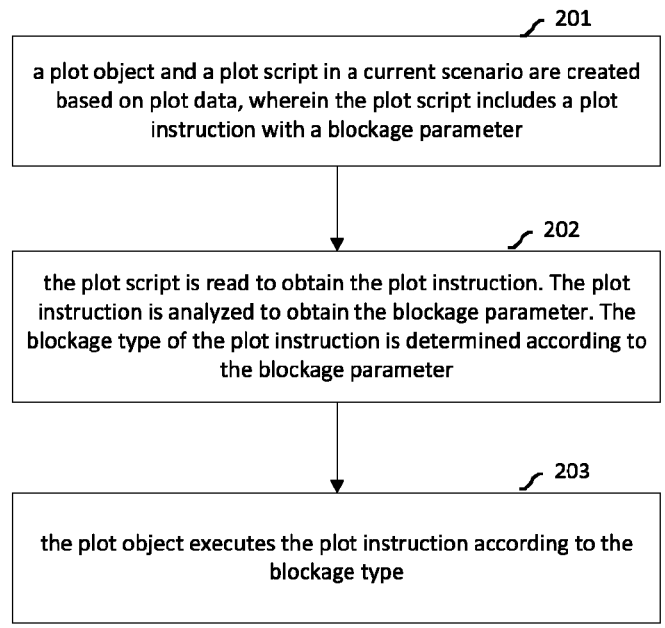

201
a plot object and a plot script in a current scenario are created based on plot data, wherein the plot script includes a plot instruction with a blockage parameter

202
the plot script is read to obtain the plot instruction. The plot instruction is analyzed to obtain the blockage parameter. The blockage type of the plot instruction is determined according to the blockage parameter

203
the plot object executes the plot instruction according to the blockage type

FIG. 2

```
function GuanYulv4 ()
        Game.Scenario_HideNpc (50348);
        Game.Scenario_HideNpc (50346);
        Game.Scenario_MoveCamera (71, 197, 71, 186, 10000, 0.02, 25, true);
        Game.Scenario_LoadNif ( "guanlvs4" , " " , 75, 200, 10000, 1.57, 1.0);
        Game.Scenario_ShowDialog (0, "guanyu" , "text" );
        Game.Scenario_Sleep (6.0);
        Game.Scenario_HideNpc (50348, false);
        Game.Scenario_HideNpc (50346, false);
        Game.Scenario_Sleep (0.001, 1);
end;
```

FIG. 3

METHOD AND APPARATUS FOR EXECUTING PLOT INSTRUCTIONS TO SHOW COMPLEX PLOTS

CROSS REFERENCE TO RELATED APPLICATIONS

This application is a continuation application of PCT/CN2013/078769 filed on Jul. 3, 2013, which claims the benefit of Chinese Patent Application No. 201210229013.7, filed on Jul. 4, 2012, the disclosure of both of which said applications are herein incorporated by reference in their entirety.

FIELD

The present disclosure relates to computer software, and more particularly, to a method and an apparatus for electronic games.

BACKGROUND

Electronic games provide entertainment means for people, which can be operated through electronic devices, e.g., computers, etc.

During process of playing games, game plots usually need to be exhibited. Conventional plot exhibition technique uses a conventional delay technique to exhibit the plot step by step. Additionally, the plot can only be simplified to be linearly presented with tedious experience over a certain period of time, greatly reducing possibility of showing complex plots.

SUMMARY

According to an example of the present disclosure, a computer-implemented method for executing plot instructions for electronic games to show complex plots is provided. The method includes:
  creating a plot object and a plot script in a current scenario based on plot data, by a processor, wherein the plot script comprises a plot instruction with a blockage parameter;
  reading the plot script to obtain the plot instruction by a processor;
  analyzing the plot instruction to obtain the plot parameter by a processor;
  determining a blockage type of the plot instruction, by a processor, according to the blockage parameter of the plot instruction; and
  the plot object executing the plot instruction, by a processor, according to the blockage type.

According to another example of the present disclosure, an apparatus for executing plot instructions for electronic games to show complex plots is provided. The apparatus includes:
  one or more processors;
  a memory; and
  one or more program units stored in the memory and to be executed by the one or more processors, the one or more program units include:
  a plot creating unit, configured to create a plot object and a plot script in a current scenario based on plot data, the plot script comprising a plot instruction with a blockage parameter; and
  a plot object processing unit, configured to:
    read the plot script to obtain the plot instruction;
    analyze the plot instruction to obtain the blockage parameter;
    determine a blockage type of the plot instruction according to the blockage parameter; and
    execute the plot instruction by the plot object according to the blockage type.

According to still another example of the present disclosure, a non-transitory computer-readable storage medium comprising a set of instructions for executing plot instructions for electronic games to show complex plots is provided, the set of instructions to direct at least one processor to perform acts of:
  creating a plot object and a plot script in a current scenario based on plot data, by a processor, wherein the plot script comprises a plot instruction with a blockage parameter;
  reading the plot script to obtain the plot instruction by a processor;
  analyzing the plot instruction to obtain the plot parameter by a processor;
  determining a blockage type of the plot instruction, by a processor, according to the blockage parameter of the plot instruction; and
  the plot object executing the plot instruction, by a processor, according to the blockage type.

Other aspects or embodiments of the present disclosure can be understood by those skilled in the art in light of the description, the claims, and the drawings of the present disclosure.

BRIEF DESCRIPTION OF THE DRAWINGS

Features of the present disclosure are illustrated by way of example and not limited in the following figures, in which like numerals indicate like elements, in which:

FIG. 2 is a schematic diagram illustrating a method for executing a plot instruction according to an example of the present disclosure.

FIG. 3 is a schematic diagram illustrating a plot script according to an example of the present disclosure.

DETAILED DESCRIPTION

The preset disclosure will be described in further detail hereinafter with reference to accompanying drawings and examples to make the technical solution and merits therein clearer.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Conventionally, delay techniques are adopted to exhibit plots step by step in field of game plot exhibition. Generally, since plot instructions in plot script according to the delay technique are executed serially one after another, a mere linear exhibition of the plot is provided. Therefore, the delay technique can be suitable to exhibit uncomplicated plots and is incapable of implementing parallel exhibition of the plots. As such, the conventional plot exhibition technique has a low plot processing capability, which refers to for example, having no ability of processing (e.g., exhibiting) complex plots. As described herein, in various examples of the present application, a method and apparatus is provided with capabilities of processing (e.g., exhibiting) complex plots by parallel exhibitions of the plots. In various embodiments, the parallel exhibitions of the plots may include interactions of plot events in the plot script. For example, the execution of one plot event may affect the execution of another plot event.

In various examples of the present disclosure, each function in the plot script can be encapsulated into a respective plot instruction, and a block technique is utilized to manage the encapsulated plot instructions, so as to realize complex plot exhibitions, such as parallel and interacted plot exhibitions.

Figure 1:
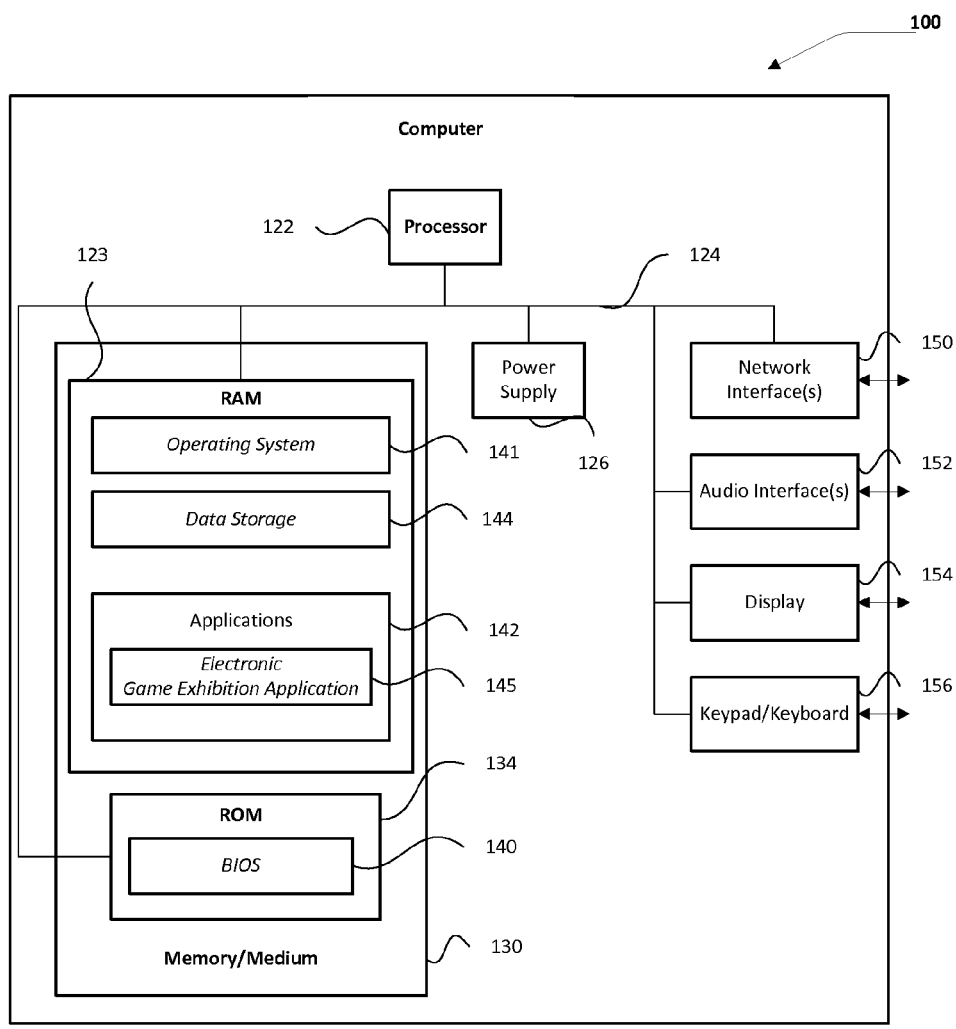
FIG. 1 is a schematic diagram illustrating an example embodiment of a computer.

In an example embodiment of a computer that may execute methods and software systems of the present application. FIG. 1 is a schematic diagram illustrating an example embodiment of a computer. A computer 100 may be a computing device capable of executing a method and apparatus of present disclosure. The computer 100 may, for example, be a device such as a personal desktop computer or a portable device, such as a laptop computer, a tablet computer, a cellular telephone, or a smart phone. The computer 100 may also be a server that connects to the above devices locally or via a network.

The computer 100 may vary in terms of capabilities or features. Claimed subject matter is intended to cover a wide range of potential variations. For example, the computer 100 may include a keypad/keyboard 156. It may also comprise a display 154, such as a liquid crystal display (LCD), or a display with a high degree of functionality, such as a touch-sensitive color 2D or 3D display. In contrast, however, as another example, a web-enabled computer 100 may include one or more physical or virtual keyboards, and mass storage medium 130.

The computer 100 may also include or may execute a variety of operating systems 141, including an operating system, such as a Windows™ or Linux™, or a mobile operating system, such as iOS™, Android™, or Windows Mobile™. The computer 100 may include or may execute a variety of possible applications 142, such as an electronic game exhibition application 145. An application 142 may enable communication with other devices via a network, such as communicating with another computer via an Internet network for online electronic games.

Further, the computer 100 may include one or more non-transitory processor-readable storage media 130 and one or more processors 122 in communication with the non-transitory processor-readable storage media 130. For example, the non-transitory processor-readable storage media 130 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 130 may store sets of instructions, or units and/or modules that comprise the sets of instructions, for conducting operations described in the present application. The one or more processors may be configured to execute the sets of instructions and perform the operations in example embodiments of the present application.

FIG. 2 is a schematic diagram illustrating a method for executing plot instructions according to an example of the present disclosed electronic game exhibition application 145. FIG. 2 is a simplified diagram according to one embodiment of the present invention. This diagram is merely an example, which should not unduly limit the scope of the claims. One of ordinary skill in the art would recognize many variations, alternatives, and modifications.

As shown in FIG. 2, the method includes at least the following processes.

In process 201, a plot object and a plot script in a current scenario are created based on plot data, wherein the plot script includes a plot instruction with a blockage parameter.

Herein, the plot object and the plot script in the current scenario are initially created based on the plot data. The plot object describes the implementation of the plot. As an embodiment, the plot object may be debugged by a computing language, e.g., C++.

The plot script includes plot instructions, each of which has a blockage parameter. The blockage parameter for the plot instruction may be configured according to experience of developers of the game. The configuration of the blockage parameter is transparent to the plot-writer of the plot. Thus, the writing of the plot becomes simple to the plot-writer. Only simple plot writing is required to obtain complex plot exhibition, such as a parallel and interacted plot exhibition. The plot data may be obtained such as by inputting by the plot-writer. Then, the plot object and the plot script in the current scenario may be created based on the plot data.

In an example of the present disclosure, a data analyzer which is generally used during game development may be utilized to receive the plot data input by the plot-writer. All plot objects bound with the current scenario may be created according to the plot data. After being created, the plot object monitors an event which can activate the plot object. After activation of the plot object is monitored, the plot object activates itself. When being activated, a plot instruction analyzer is created and the plot script is read by the plot instruction analyzer.

In the example of the present disclosure, the serial plot instructions may exhibit a parallel, interacted plot through various blockage types.

In order to provide an interacted plot exhibition, various kinds of blockage types are provided in examples of the present disclosure, including a global block type, a same instruction block type, a same object block type, a same instruction same object block type, a non-blocking type, a self-defined block type, etc. Accordingly, each plot instruction has a corresponding blockage parameter of its own. In particular, the blockage parameter may include a global blockage parameter, a same instruction blockage parameter, a same object blockage parameter, a same instruction same object blockage parameter, a non-blocking parameter or a self-defined blockage parameter, etc.

Since each plot instruction has its own corresponding blockage parameter, the blockage type of the plot instruction may be determined based on the blockage parameter.

In process 202, the plot script is read to obtain the plot instruction. The plot instruction is analyzed to obtain the blockage parameter. The blockage type of the plot instruction is determined according to the blockage parameter.

Herein, after being created, plot object can monitor a designated game event. After being activated by the designated game event, the plot object reads and analyzes the plot script to collect the plot instructions in the plot script, and determines the blockage type of each plot instruction according to its blockage parameter. When being activated, the plot object creates the plot instruction analyzer and read the plot script. The plot instructions in the plot script are collected according to the read plot scrip. An instruction list is created. The plot instruction analyzer creates corresponding plot instructions according to the instruction list. Then, during each frame update of the game, the plot instructions in the instruction list can be executed simultaneously with refreshing of series of the picture frames of the electronic game, for example being displayed on user interface of the electronic game.

For example, FIG. 3 is a schematic diagram illustrating a plot script according to an example of the present disclosure. FIG. 3 is a simplified diagram according to one embodiment of the present invention. This diagram is merely an example, which should not unduly limit the scope of the claims. One of ordinary skill in the art would recognize many variations, alternatives, and modifications.

As shown in FIG. 3, the plot script contains sentences arranged one after another. Each sentence in this embodiment can be referred to as a plot instruction. Each plot instruction represents a specific function.

When the plot object reads the plot script, an instruction id is generated for each plot instruction in the plot script. When the plot object finishes the reading of the whole plot script, a group of instruction ids are generated. Then, the plot object creates the plot instruction analyzer and provides the group of instruction ids to the plot instruction analyzer. After receiving the group of instruction ids, the plot instruction analyzer creates a respective class (equated to a functional unit) for executing the instruction for each instruction id. Therefore, the plot instruction is a sentence in the plot script. The plot instruction is analyzed to obtain a class executing a detailed function and a blockage parameter of the plot instruction.

In process 203, the plot object executes the plot instruction according to the blockage type.

After creating all of the instructions, the plot instruction analyzer executes the instructions according to a sequence that these instructions are written in the plot script. In a scenario, the instructions in the plot script are linear. If a parallel plot logic is desired, the blockage parameters of the instructions may be utilized to adjust the sequence of the execution of the instructions by means of such as multi-blockage techniques, i.e., using multiple blockages during each circle of the graph frames.

In various examples of the present disclosure, the plot instructions may include a moving instruction, a moving camera instruction, a reading plot model file instruction, a displaying dialog tree instruction, etc.

In the examples of the present disclosure, multiple blockage methods may be used, e.g., a global block method, a same instruction block method, a same instruction same object block method, a self-defined block method, etc.

In one example of the present disclosure, the blockage parameter is the global blockage parameter. At this time, the determining of the blockage type of the plot instruction according to the blockage parameter in process 202 includes: determining the blockage type of the plot instruction is the global block. In process 203, after executing the plot instruction, the plot object stops executing of the plot instructions, so as to realize a global block effect.

In another example of the present disclosure, the blockage parameter is the same instruction blockage parameter. At this time, the determining the blockage type of the plot instruction according to the blockage parameter in process 202 includes: determining the blockage type of the plot instruction is the same instruction block. In process 203, the plot object executes the plot instruction, after executing this plot instruction, the plot object does not execute plot instructions having the same blockage type with this plot instruction, so as to realize a same instruction block effect.

In still another example of the present disclosure, the blockage parameter is the non-blocking parameter. At this time, the determining the blockage type of the plot instruction according to the blockage parameter in process 202 includes: determining the blockage type of the plot instruction is non-blocking type. In process 203, the plot object executes the plot instruction normally. And after executing the plot instruction, the plot object executes a next plot instruction normally, so as to realize a non-blocking effect.

In still another example of the present disclosure, the blockage parameter is the same object blockage parameter. At this time, the determining the blockage type of the plot instruction according to the blockage parameter in process 202 includes: determining the blockage type of the plot instruction is the same object block. In process 203, the plot object executes the plot instruction. And after executing the plot instruction, the plot object does not execute plot instructions related to this plot object, so as to realize a same object block effect.

In still another example of the present disclosure, the blockage parameter is the same instruction same object parameter. At this time, the determining the blockage type of the plot instruction according to the blockage parameter in process 202 includes: determining the blockage type of the plot object is the same instruction same object block. In process 203, the plot object executes the plot instruction. After executing the plot instruction, the plot object does not execute plot instructions which have the same type with this plot instruction and are related to this plot object, so as to realize a same instruction same object block effect.

If the number of blockage types is fixed, the blockage types are limited. Therefore, a self-defined blockage type is provided. A required block effect may be realized through the self-defined blockage type to obtain a desired plot exhibition. In particular, a corresponding configuration may be performed to the blockage parameter of the plot instruction to realize the self-defined blockage.

In addition, in order to exhibit a complex scenario such as a war, the plot-writer may put plot instructions into groups according to a requirement of the plot through configuring different group identifiers to the plot instructions. Thus, the plot instructions with the same group identifier belong to the same group. Each plot instruction in the group has a blockage parameter, such that each group of plot instructions in the large scenario has its own instruction execution order, which provides a more vivid large scenario plot. A blockage parameter may also be configured for the group. In an example, the groups may be configured to execute in parallel manner. After being put into the group, the block of the plot instruction may be only available within the group. For example, if the blockage of the plot instruction is assigned to global block type, only plot instructions in the group are blocked when this plot instruction is executed.

For example, in a battle scenario, there may be hundreds of battle roles fighting with each other. At this time, plot instructions of each two roles fighting with each other may be put into a particular group. The two roles in the particular group have their own instruction execution order. Different groups may be executed in parallel and independent from each other. Thus, a large and complex scenario can be effectively exhibited.

Besides being configured to run in parallel and dependently, other blockage types may be configured for the groups. In one example, one group may be seen as one plot instruction. If a global block is configured for one group, other groups behind this group will not be executed after this group is executed. According to substantially same method presented as the above mentioned examples, those ordinarily skilled in the art may configure other blockage types for the groups according to practical requirements.

Figure 4:
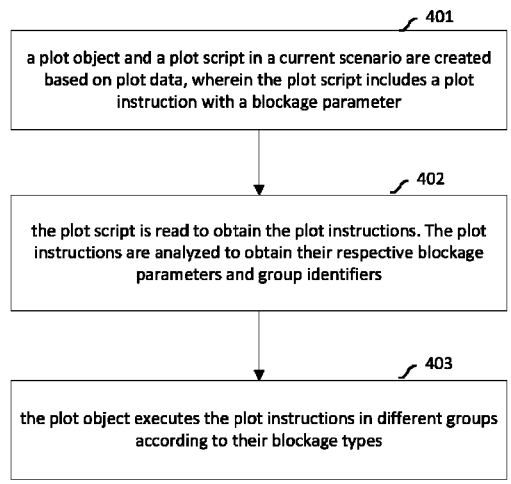
FIG. 4 is a schematic diagram illustrating a method for executing a plot instruction according to another example of the present disclosure.

FIG. 4 is a flowchart illustrating a method for executing a plot instruction according to another example of the present disclosure. In this example, the plot instructions in the plot script are put into different groups. FIG. 4 is a simplified diagram according to one embodiment of the present invention. This diagram is merely an example, which should not unduly limit the scope of the claims. One of ordinary skill in the art would recognize many variations, alternatives, and modifications.

In process 401, a plot object and a plot script in a current scenario are created based on plot data, wherein the plot script includes a plot instruction with a blockage parameter.

This process 401 is substantially the same with process 201.

In process 402, the plot script is read to obtain the plot instructions. The plot instructions are analyzed to obtain their respective blockage parameters and group identifiers. The blockage type of each plot instruction is determined according to its corresponding blockage parameter, and the group that the plot instruction belongs to is determined according to its group identifier.

In this process 402, the method for obtaining the plot instructions and determining the blockage type of each plot instruction is substantially the same with that described in block 202.

In process 403, the plot object executes the plot instructions in different groups according to their blockage types.

In one example, the plot instructions in different groups may be executed in parallel. In other words, for each group, the plot instructions in the group are executed according to their blockage parameters. The blockage of the plot instruction in one group does not affect execution of plot instructions in other groups, i.e., different groups do not impact with each other.

In various examples of the present disclosure, the plot-writer may configure some plot instructions as important instructions. If all of these important instructions have been executed, it may indicate that the plot ends.

Based on the above description, an example of the present disclosure further provides an apparatus for executing plot instructions.

Figure 5:
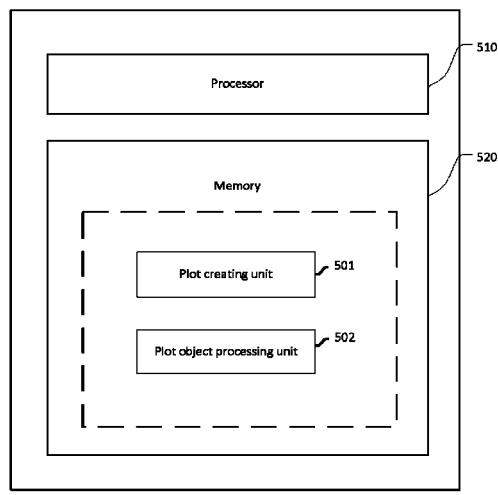
FIG. 5 is a schematic diagram illustrating a structure of an apparatus for executing a plot instruction according to an example of the present disclosure.

FIG. 5 is a schematic diagram illustrating configuration of the apparatus for executing plot instructions according to an example of the present disclosure. FIG. 5 is a simplified diagram according to one embodiment of the present invention. This diagram is merely an example, which should not unduly limit the scope of the claims. One of ordinary skill in the art would recognize many variations, alternatives, and modifications.

As shown in FIG. 5, the apparatus includes:
one or more processors 510;
a memory 520; and
one or more program units stored in the memory 520 and to be executed by the one or more processors 510, the one or more program units include: a plot creating unit 501 and a plot object processing unit 502.

The plot creating unit 501 is configured to create a plot object and a plot script in a current scenario based on plot data, wherein the plot script includes a plot instruction with a blockage parameter.

The plot object processing unit 502 is configured to read the plot script to obtain the plot instruction, analyze the plot instruction to obtain the blockage parameter, determine a blockage type of the plot instruction according to the blockage parameter, wherein the plot object executes the plot instruction according to the blockage type.

In one example, the blockage parameter is a global blockage parameter. The plot object processing unit 502 is configured to read the plot script to obtain the plot instruction, analyze the plot instruction to obtain the global blockage parameter, determine the blockage type of the plot instruction according to the global blockage parameter as the global blockage type, wherein the plot object stops executing of the plot instructions after executing this plot instruction.

In another example, the blockage parameter is a same instruction blockage parameter. The plot object processing unit 502 is configured to read the plot script to obtain the plot instruction, analyze the plot instruction to obtain the same instruction blockage parameter, determine the blockage type of the plot instruction according to the same instruction blockage parameter as the same instruction blockage type, wherein the plot object does not execute plot instructions having the same blockage type with this plot instruction after executing this plot instruction.

In still another example, the blockage parameter is a non-blocking parameter. The plot object processing unit 502 is configured to read the plot script to obtain the plot instruction, analyze the plot instruction to obtain the non-blocking parameter, determine the blockage type of the plot instruction according to the non-blocking parameter as non-blocking type, wherein the plot object executes plot instructions normally after executing this plot instruction.

In still another example, the blockage parameter is a same object blockage parameter. The plot object processing unit 502 is configured to read the plot script to obtain the plot instruction, analyze the plot instruction to obtain the same object blockage parameter, determine the blockage type of the plot instruction according to the same object blockage parameter as the same object blockage type, wherein the plot object does not execute plot instructions related to this plot object after executing this plot instruction.

In still another example, the blockage parameter is a same instruction same object blockage parameter. The plot object processing unit 502 is configured to read the plot script to obtain the plot instruction, analyze the plot instruction to obtain the same instruction same object blockage parameter, determine the blockage type of the plot instruction according to the same instruction same object blockage parameter as the same instruction same object blockage type, wherein the plot object does not execute plot instructions which have the same blockage type with this plot instruction and are related to this plot object after executing this plot instruction.

If the number of blockage types is fixed, the blockage types are limited. Therefore, a self-defined blockage type is provided. A required block effect may be realized through the self-defined blockage type to obtain a desired plot exhibition. In particular, a corresponding configuration may be performed to the blockage parameter of the plot instruction to realize the self-defined blockage.

In addition, in order to exhibit a complex scenario such as a war, the plot-writer may put plot instructions into groups according to a requirement of the plot through configuring different group identifiers to the plot instructions. Thus, the plot instructions with the same group identifier belong to the same group. Each plot instruction in the group has a blockage parameter, such that each group of plot instructions in the large scenario has its own instruction execution order, which provides a more vivid large scenario plot.

At this time, besides the blockage parameter, each plot instruction further includes a group identifier configured by the plot-writer. The plot object processing unit 402 is further configured to determine the group that the plot instruction belongs to according to the group identifier of the plot instruction, and execute the plot instructions in different groups according to their blockage types.

Figure 6:
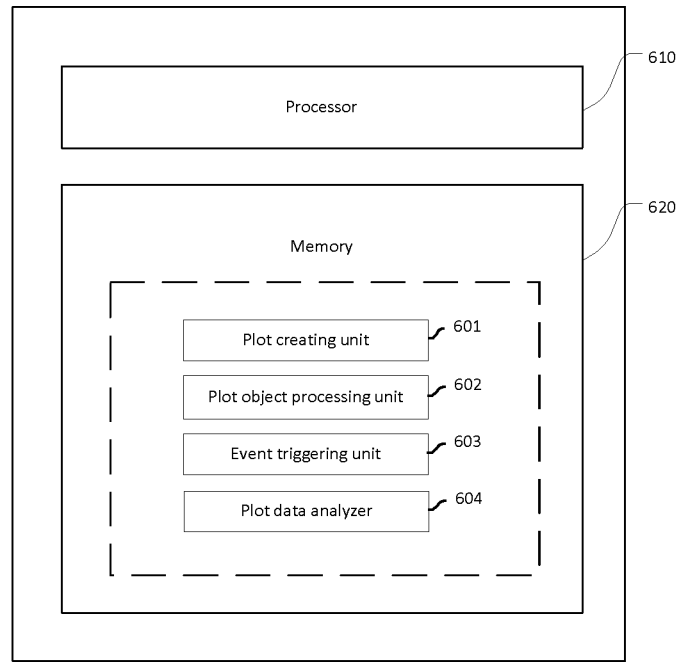
FIG. 6 is a schematic diagram illustrating a structure of an apparatus for executing a plot instruction according to another example of the present disclosure.

Based on the above description of the apparatus for executing the plot instructions, FIG. 6 shows another configuration of the apparatus for executing the plot instructions according to an example of the present disclosure.

As shown in FIG. 6, the apparatus includes:
one or more processors 610;
a memory 620; and
one or more program units stored in the memory 620 and to be executed by the one or more processors 610, the one or more program units include: a plot creating unit 601, a plot object processing unit 602, an event triggering unit 603 and a plot data analyzer 604.

FIG. 6 is a simplified diagram according to one embodiment of the present invention. This diagram is merely an example, which should not unduly limit the scope of the claims. One of ordinary skill in the art would recognize many variations, alternatives, and modifications.

The event triggering unit 603 is configured to receive an event in a game and transmit the event to the plot object processing unit 602.

The plot data analyzer 604 is configured to receive plot data filled in a pre-defined table by the plot-writer and provide the plot data to the plot creating unit 601. The plot data includes relevant information of plot object creation, triggering and broadcast.

The plot creating unit 601 is configured to obtain the plot data from the plot data analyzer 604, create a plot object and a plot script in a current scenario based on the plot data, wherein the plot script includes a plot instruction with a blockage parameter. The detailed functions of the plot creating unit 601 in FIG. 6 are similar to those of the plot creating unit 501 in FIG. 5.

The plot object processing unit 602 is configured to activate the plot object after receiving the event transmitted by the event triggering unit 603, use the plot object to read the plot script to obtain the plot instruction, analyze the plot instruction to obtain the blockage parameter, determine a blockage type of the plot instruction according to the blockage parameter, wherein the plot object executes the plot instruction according to the blockage type.

The above units may be implemented by software (e.g. machine readable instructions stored in a memory and executable by a processor), hardware (e.g. the processor of an ASIC), or a combination thereof.

Figure 7:
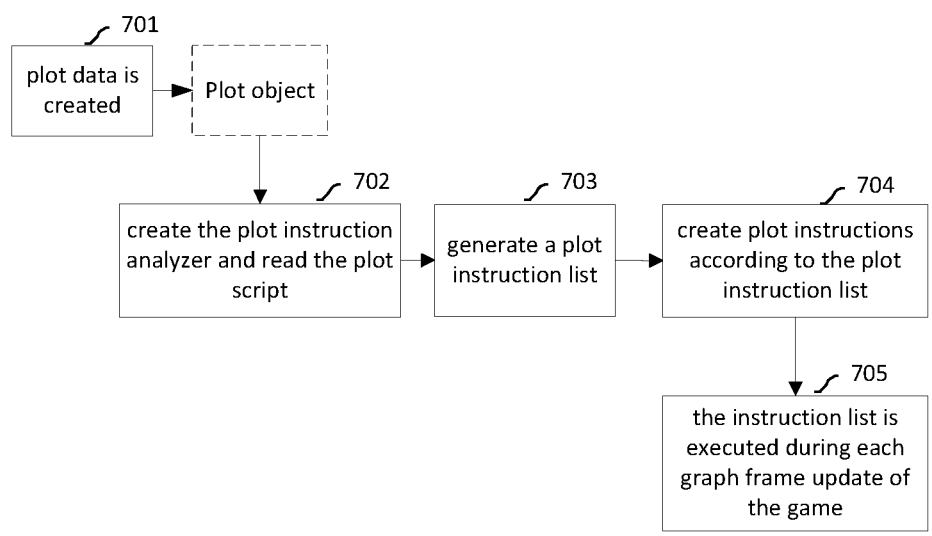
FIG. 7 is a schematic diagram illustrating a method for executing a plot instruction according to an example of the present disclosure.

Based on the above structure, FIG. 7 shows a method for executing plot instructions according to an example of the present disclosure. FIG. 7 is a simplified diagram according to one embodiment of the present invention. This diagram is merely an example, which should not unduly limit the scope of the claims. One of ordinary skill in the art would recognize many variations, alternatives, and modifications.

As shown in FIG. 7, the method includes the following processes.

In process 701, plot data is created in a plot data analyzer 604. The plot data is transmitted to the plot creating unit 601 which creates all plot objects bound with the current scenario according to the plot data provided by the plot data analyzer 604. After being created, each plot object monitors a plot event which can activate the plot object. The event triggering unit 603 receives various plot events in the game and provides them to the plot creating unit 601.

In process 702, after monitoring the plot event activating the plot object, the plot object activates itself, and creates the plot instruction analyzer and reads the plot script through the plot instruction analyzer.

In process 703, after being activated, the plot object read the plot script to collect plot instructions in the plot script and generates a plot instruction list.

In process 704, the plot instruction analyzer creates plot instructions according to the plot instruction list. For example, each instruction represents a specific function. When the plot object reads the plot script, an instruction id is generated for each plot instruction in the plot script. When the plot object finishes the reading of the whole plot script, a group of instruction ids are generated. Then, the plot object creates the plot instruction analyzer and provides the group of instruction ids to the plot instruction analyzer. After receiving the group of instruction ids, the plot instruction analyzer creates a respective class (equated to a functional unit) for executing the instruction for each instruction id.

In process 705, the instruction list is executed during each graph frame update of the game. When the instructions in the instruction list are executed circularly, multi-blockage techniques may be adopted, i.e., using multiple blockages during each circle of the graph frames. In examples of the present disclosure, multiple blockage methods may be used, e.g., a global block method, a same instruction block method, a same instruction same object block method or a self-defined block method, etc.

It can be seen from the above that, in examples of the present disclosure, the plot object and the plot script in the current scenario are initially created based on the plot data. The plot script includes the plot instruction with the blockage parameter. The plot script is read to obtain the plot instruction. The plot instruction is analyzed to obtain the blockage parameter. The blockage type of the plot instruction is determined according to the blockage parameter. The plot object executes the plot instructions according to the blockage types. Thus, according to the present disclosure, the serial plot instructions may provide a parallel and interacted plot exhibition through various blockage types, which improves the game plot exhibition efficiency and the plot processing capability.

In addition, in the present disclosure, the blockage types include the global block type, the same instruction block type, the same object block type, the same instruction same object block type, the non-blocking type or the self-defined block type. Furthermore, through the instruction group, each role in the large scenario may have its own instruction execution order. Therefore, a more vivid large scenario plot may be provided.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A computer-implemented method for executing plot instructions for electronic games to show complex plots, comprising:
   creating at least one plot object and a plot script in a current scenario based on plot data, by a processor, wherein the plot script comprises at least one plot instruction each of which has a blockage parameter, and wherein each of the at least one plot object is for executing at least one of the at least one plot instruction;
   reading the plot script to obtain the at least one plot instruction by the processor;
   for each plot instruction of the at least one plot instruction, analyzing the plot instruction to obtain the plot parameter of the plot instruction by the processor; and determining a blockage type of the plot instruction, by the processor, according to the blockage parameter of the plot instruction; and
   the at least one plot object executing the at least one plot instruction, by the processor, according to the blockage type of the each plot instruction, wherein a sequence of execution of the at least one plot instruction is adjusted according to the blockage type of the each plot instruction.

2. The computer-implemented method of claim 1, wherein:
   when it is determined that the blockage type of one plot instruction of the at least one plot instruction is a global blockage type,
   in the process of executing the at least one plot instruction according to the blockage type of the each plot instruction, after execution of the one plot instruction, execution of any plot instruction is stopped.

3. The computer-implemented method of claim 1, wherein:
   when it is determined that the blockage type of one plot instruction of the at least one plot instruction is a same instruction blockage type,
   in the process of executing the at least one plot instruction according to the blockage type of the each plot instruction, after execution of the one plot instruction, execution of any plot instruction having the same type with the one plot instruction by the plot object is prevented.

4. The computer-implemented method of claim 1, wherein:
   when it is determined that the blockage type of one plot instruction of the at least one plot instruction is a non-blocking type,
   in the process of executing the at least one plot instruction according to the blockage type of the each plot instruction, after execution of the one plot instruction, plot instructions are executed normally.

5. The computer-implemented method of claim 1, wherein:
   when it is determined that the blockage type of one plot instruction of the at least one instruction plot is a same object blockage type,
   in the process of executing the at least one plot instruction according to the blockage type of the each plot instruction, after execution of the one plot instruction, execution of any plot instruction related to the same plot object with the one plot instruction is prevented.

6. The computer-implemented method of claim 1, wherein:
   when it is determined that the blockage type of one plot instruction of the at least one plot instruction is a same instruction same object blockage type,
   in the process of executing the at least one plot instruction according to the blockage type of the each plot instruction, after execution of the one plot instruction, execution of any plot instruction which has the same blockage type with the one plot instruction and is related to the same plot object with the one plot instruction is prevented.

7. The computer-implemented method of claim 1, wherein:
   the plot script comprises a plurality of plot instructions;
   each plot instruction comprises a respective group identifier;
   plot instructions in a same group is executed by a same plot object;
   the process of reading the plot script to obtain the at least one plot instruction comprises:
   reading the plot script to obtain the plot instructions in different groups according to the group identifiers of the plot instructions;
   the process of for each plot instruction of the at least one plot instruction, analyzing the plot instruction to obtain the blockage parameter and determining the blockage type of the plot instruction according to the blockage parameter comprises:
   analyzing each plot instruction in a same group to obtain the blockage parameter of the plot instruction and determining the blockage type of the plot instruction according to the blockage parameter;
   the process of executing the at least one plot instruction according to the blockage type of the each of the plot instruction comprises: executing, by a same plot object, each plot instruction in the same group according to the blockage type of the plot instruction.

8. An apparatus for executing plot instructions for electronic games to show complex plots, comprising:
   one or more processors;
   a memory; and
   one or more program units stored in the memory and to be executed by the one or more processors, the one or more program units comprise:
   a plot creating unit, configured to create at least one plot object and a plot script in a current scenario based on plot data, the plot script comprising at least one plot instruction each of which has a blockage parameter and each of the at least one plot object being for executing at least one of the at least one plot instruction; and
   a plot object processing unit, configured to:
   read the plot script to obtain the at least one plot instruction;
   for each plot instruction of the at least one plot instruction, analyze the plot instruction to obtain the blockage parameter of the plot instruction ; and determine a blockage type of the plot instruction according to the blockage parameter; and
   execute the at least one plot instruction by the plot object according to the blockage type of the each plot instruction, wherein the plot object processing unit is configured to adjust a sequence of execution of the at least one plot instruction according to the blockage type of the each plot instruction.

9. The apparatus of claim 8, wherein:
   the plot object processing unit is configured to:
   when it is determined that the blockage type of one plot instruction of the at least one plot instruction is a global blockage type,
   stop executing any other plot instruction after execution of the one plot instruction.

10. The apparatus of claim 8, wherein:
    the plot object processing unit is configured to:
    when it is determined that the blockage type of one plot instruction of the at least one plot instruction is a same instruction blockage type prevent from executing plot instructions having the same blockage type with the plot instruction after execution of the one plot instruction.

11. The apparatus of claim 8, wherein:
the plot object processing unit is configured to:
when it is determined that the blockage type of one plot instruction of the at least one blockage type is a non-blocking type,
execute plot instructions normally after execution of the one plot instruction.

12. The apparatus of claim 8, wherein:
the plot object processing unit is configured to:
when it is determined that the blockage type of one plot instruction of the at least one plot instruction is a same object blockage type,
prevent from executing plot instructions related to the same plot object with the plot instruction after execution of the one plot instruction.

13. The apparatus of claim 8, wherein:
the plot object processing unit is configured to:
when it is determined that the blockage type of one plot instruction of the at least one plot instruction is a same instruction same object blockage type,
prevent from executing plot instructions which have the same blockage type with the one plot instruction and are related to the same plot object with the one plot instruction after execution of the one plot instruction.

14. The apparatus of claim 8, wherein:
the plot script comprises a plurality of plot instructions and each plot instruction further comprises a respective group identifier;
plot instructions in a same group is executed by a same plot object;
the plot object processing unit is further configured to:
read the plot script to obtain the plot instructions in different groups according to the group identifiers of the plot instructions;
analyze each plot instruction in a same group to obtain the blockage parameter of the plot instruction;
determine the blockage type of the plot instruction according to the blockage parameter; and
execute the plot instruction in the same group, by a same plot object according to the blockage type of the plot instruction.

15. A non-transitory computer-readable storage medium comprising a set of instructions for executing plot instructions for electronic games to show complex plots, the set of instructions to direct at least one processor to perform acts of:
creating at least one plot object and a plot script in a current scenario based on plot data, by a processor, wherein the plot script comprises at least one plot instruction each of which has a blockage parameter;
reading the plot script to obtain the at least one plot instruction by the processor;
for each plot instruction of the at least one plot instruction, analyzing the plot instruction to obtain the plot parameter of the plot instruction by the processor; and determining a blockage type of the plot instruction, by the processor, according to the blockage parameter of the plot instruction; and
the plot object executing the at least one plot instruction, by the processor, according to the blockage type of the each plot instruction, wherein a sequence of execution of the at least one plot instruction is adjusted according to the blockage type of the each plot instruction.

16. The non-transitory computer-readable storage medium of claim 15, wherein:
when it is determined that the blockage type of one plot instruction is a global blockage type,
in the process of executing the at least one plot instruction according to the blockage type of the each plot instruction, after execution of the one plot instruction, execution of any plot instruction by the plot object after execution of the one plot instruction is stopped.

17. The non-transitory computer-readable storage medium of claim 15, wherein: when it is determined that the blockage type of the plot instruction is a same instruction blockage type,
in the process of executing the at least one plot instruction according to the blockage type of the each plot instruction, after execution of the one plot instruction, execution of any plot instruction having the same type with the one plot instruction is prevented.

18. The non-transitory computer-readable storage medium of claim 15, wherein:
when it is determined that the blockage type of one plot instruction of the at least plot instruction is a non-blocking type,
in the process of executing the at least one plot instruction according to the blockage type of the each plot instruction, after execution of the one plot instruction,
plot instructions is executed normally.

19. The non-transitory computer-readable storage medium of claim 15, wherein: when it is determined that the blockage type of one plot instruction of the at least one is a same object blockage type,
in the process of executing the at least one plot instruction according to the blockage type of the each plot instruction, after execution of the one plot instruction,
execution of any plot instruction related to a same plot object with the one plot instruction is prevented.

20. The non-transitory computer-readable storage medium of claim 15, wherein: when it is determined that the blockage type of one plot instruction of the at least one plot instruction is a same instruction same object blockage type,
in the process of executing the at least one plot instruction according to the blockage type of the each plot instruction, after execution of the one plot instruction,
execution of any plot instruction which has the same type with the one plot instruction and are related to the same plot object with the one plot instruction is prevented.

* * * * *